A. DREW, DEC'D.
E. A. OSBORNE & S. NIELD, EXECUTORS.
SPRING FORK FOR CYCLES, MOTOR CYCLES, AND THE LIKE.
APPLICATION FILED AUG. 31, 1914.

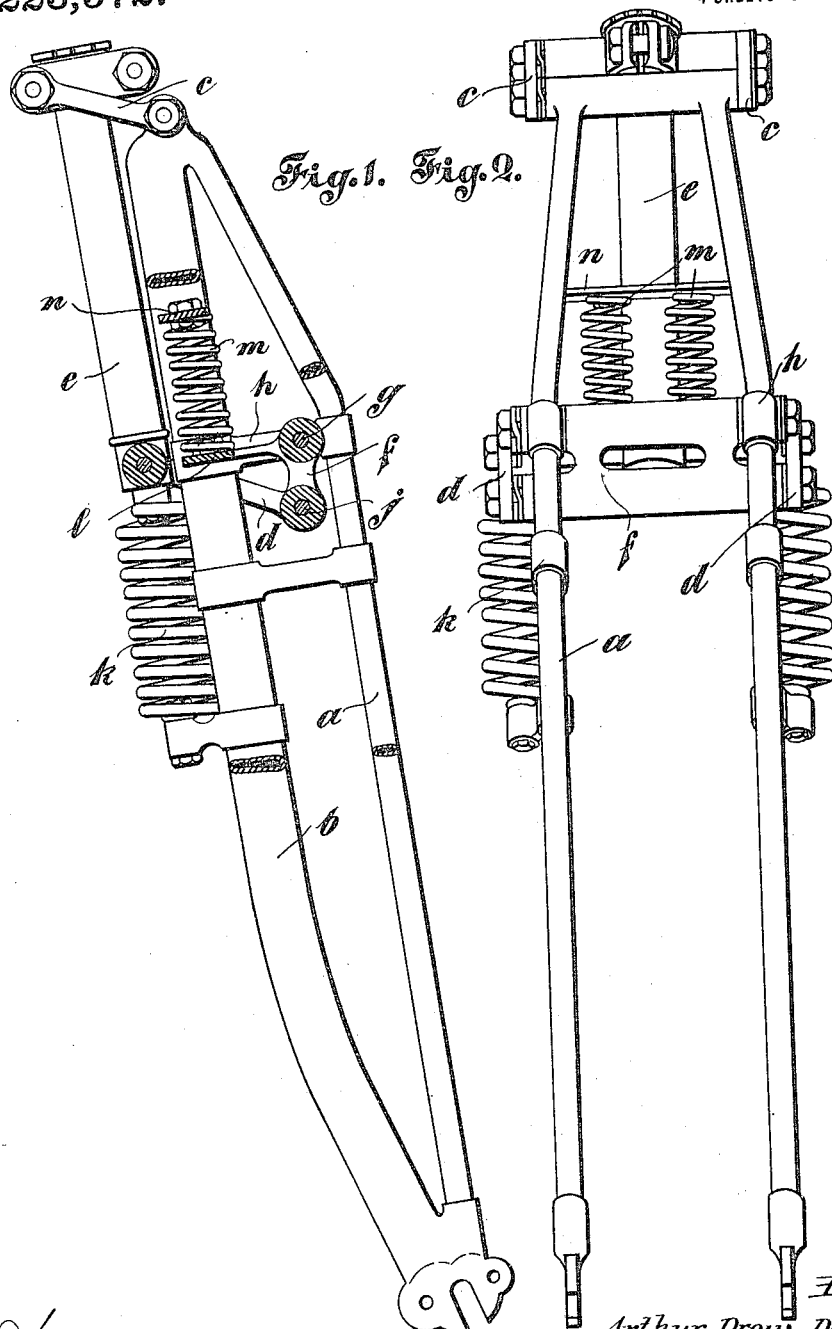

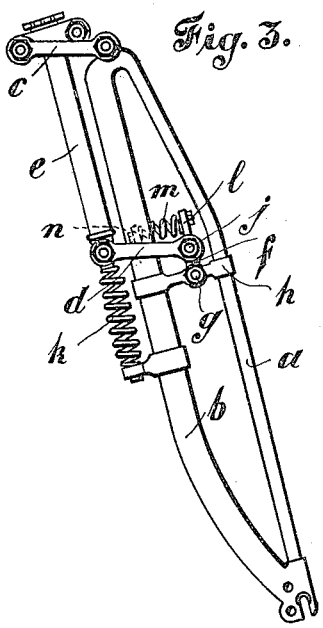
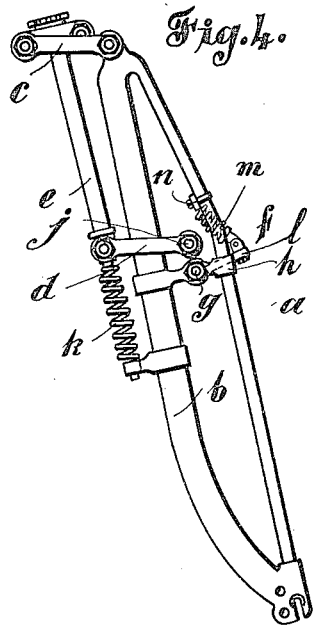
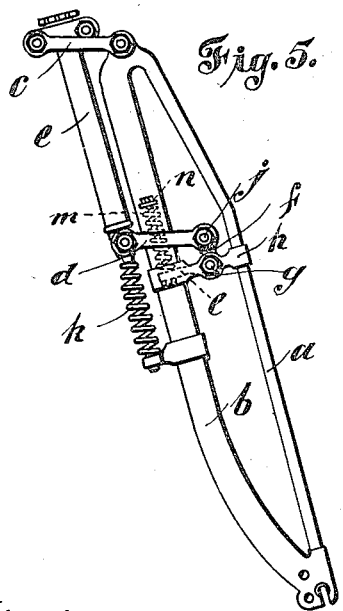
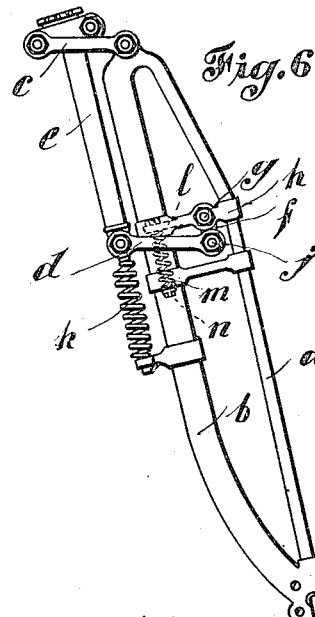

1,223,572. Patented Apr. 24, 1917.
4 SHEETS—SHEET 3.

Inventor
Arthur Drew, Dec'd by
Edith Augusta Osborne
and Samuel Nield Executors
by B. Singer Atty.

Witnesses:
M. A. Helmig
H. P. Harwood

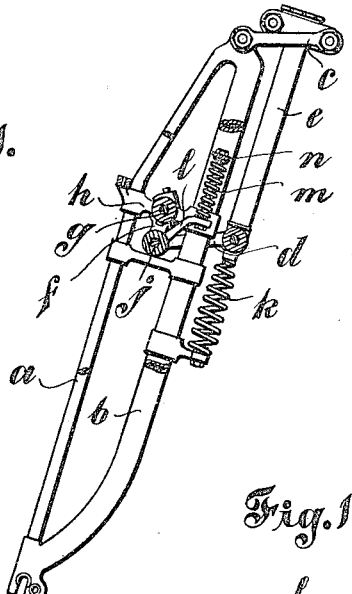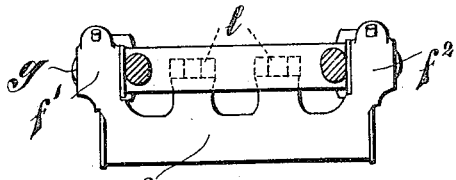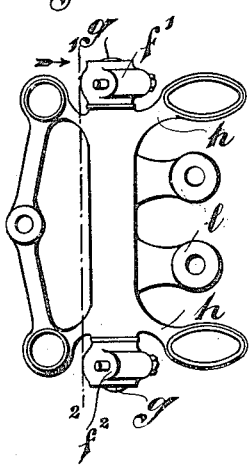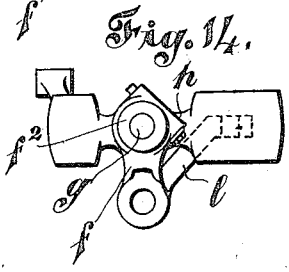

UNITED STATES PATENT OFFICE.

ARTHUR DREW, DECEASED, BY EDITH A. OSBORNE AND SAMUEL NIELD, EXECUTORS, BOTH OF WYTHALL, ENGLAND, ASSIGNORS OF ONE-HALF TO WILLIAM HOLDER OSBORNE AND ONE-HALF TO EDITH AUGUSTA OSBORNE, BOTH OF WYTHALL, ENGLAND.

SPRING-FORK FOR CYCLES, MOTOR-CYCLES, AND THE LIKE.

1,223,572.  Specification of Letters Patent.  Patented Apr. 24, 1917.

Application filed August 31, 1914. Serial No. 859,498.

*To all whom it may concern:*

Be it known that we, EDITH AUGUSTA OSBORNE, subject of the Kingdom of Great Britain, residing at Rostrevor, Lea Green Lane, Grimes Hill, Wythall, in the district of Bromsgrove, in the county of Worcester, England, and SAMUEL NIELD, subject of the Kingdom of Great Britain, residing at The Manse, Wythall aforesaid, are the sole executors of the last will and testament, with a codicil thereto, of ARTHUR DREW, deceased, and that the said ARTHUR DREW did invent certain new and useful Improvements in or Relating to Spring-Forks for Cycles, Motor-Cycles, and the like; and we hereby declare that the following is a full, clear, and exact description of the same.

This invention comprises certain improvements in or relating to spring forks for cycles, motor cycles, and the like, and is of the type in which the fork is adapted to move in relation to the head by virtue of a parallelogrammic mechanism, or mechanism comprising or involving a link or system of links associated with the crown or lower extremity of the steering head, and a second link or system of links associated with the upper extremity of the steering head, a resilient medium or media being incorporated to control the movement of the fork in relation to the steering head.

According to the present invention, the lower or upper link or links is or are coupled to, and have a pivotal movement in relation to, an oscillatory member adapted itself to have a pivotal movement about an axis disposed at a position which, while being removed from the axis of pivotal connection between the link or links and oscillatory member, is near to the end of the parallelogrammic mechanism at which the connection of the link or links with the oscillatory member occurs.

By the arrangement according to the present invention, we obtain a high standard of lateral rigidity and efficiency, and generally increase and improve the utility and construction of the fork.

In order that this invention may be readily understood and more easily carried into practice, reference may be had to the explanatory four sheets of drawings, upon which:—

Figures 1 and 2 illustrate respectively in side and front elevations one form of fork according to the present invention.

Figs. 3 to 10 illustrate in side elevation eight different modifications of the fork according to the present invention.

Fig. 11 is a side elevation, partly in section, illustrating a tenth form of mechanism embodying the invention.

Fig. 12 is a top plan view of the transverse strut and the oscillating member used in carrying out the invention, the same being shown as removed from Fig. 11.

Fig. 13 is a sectional view of the parts shown in Fig. 12 taken on the lines 1—2 of Fig. 12 looking in the direction of the arrow.

Fig. 14 is an elevational view of the parts shown in Fig. 12 taken in the direction at right angles to Fig. 13.

Figure 7:
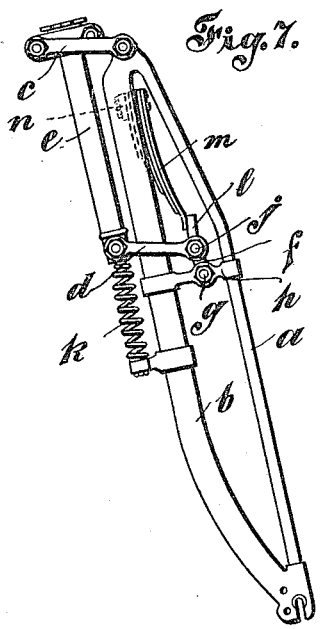

In a convenient embodiment of the present invention, the fork is of the girder type having supplementary struts $a$ disposed in front of the main blades $b$, which latter as well as the supplementary struts extend to a position at or near the upper extremity of the steering head $e$. Such fork is connected at its upper extremity to the upper extremity of the steering head by two links $c$, while two further links $d$ connect the lower extremity of the steering head with an oscillating member $f$ which is mounted on a pivot $g$ installed transversely in the fork. Advantageously at a suitable position between top and bottom of the fork, struts $h$ or connecting elements connect the rear or main blades of the fork with the front or supplementary struts of the fork, and such connecting struts $h$ each carry, at a position intermediate to the supplementary struts and main blades of the fork, the one end of a spindle $g$, around the central part of which spindle the oscillating member $f$ is mounted. Such oscillating member $f$ has an elongated bearing along the central part of its transverse spindle $g$ in such a manner that lateral movement of the oscillating member $f$ is effectively counteracted. For this purpose, in the alternative arrangement shown in Figs. 11, 12, 13 and 14, instead of having an elongated bearing part extending throughout substantially the entire length of the central part of its carrier spindle, the oscillating member $f$ may be furnished with two bearing members $f^1$, $f^2$, one associated with each end of its carrier spindle $g$, so that while the oscillating member is enabled to freely operate in its proper movement, any tendency to displace it laterally or out of its proper axis is effectively counteracted by the distribution of its bearing across the width of the fork. The oscillating member $f$ carries a spindle $j$ to which the lower links $d$ of the fork are pivoted, so that one movement of the fork may take place by virtue of the oscillation of the links in relation to their pivot carried by the oscillating member, while another movement of the fork may take place by virtue of the oscillation of the member $f$ carrying the spindle $j$ to which the links are pivoted. The movement of the oscillating member $f$ may be controlled by a spring or springs $m$ or other resilient members, which latter may be incorporated in any suitable manner, and may advantageously be adapted to act in compression. The oscillating member may be comprised of two elongated tubuli connected together by two or any suitable number of integral connecting portions, the one tubulus being adapted to receive the spindle $g$, and the other tubulus being adapted to receive the spindle for the links, the forward extremities of the links being adapted to occupy positions adjacent to the extremities of such other tubulus, spring washers being however incorporated if desired between the links and the ends of the tubulus. The oscillating member may be furnished with arms $l$ which, at their projecting extremities, are connected to the coiled springs $m$, which latter at their other extremities are connected to any suitable part, such as a transverse member $n$ of the fork. Rubber cushions or a pneumatic device or devices may, however, be used in lieu of the springs. The position or method of incorporation of the springs or resilient medium or media may be varied considerably.

Instead of being carried by an oscillating member, the front spindle of the lower links of the fork, may, if desired, be mounted in any other suitable manner permitting of its movement in relation to the fork, such movement being controlled by a resilient medium or media.

The springs or resilient members $k$ for controlling the ordinary movement of the fork in relation to the steering head may be arranged or incorporated in any suitable manner, as for instance at a position underneath the head or between the latter and rearward projections provided upon the rear or main blades of the fork.

The modification shown in Fig. 3 differs from the modification shown in Fig. 1 in that the oscillatory member $f$ extends upwardly from its point of oscillation being connected at its upper extremity to the springs which extend rearwardly, the lower links being connected in such an arrangement to the oscillatory member at a position intermediate its ends.

Figure 8:
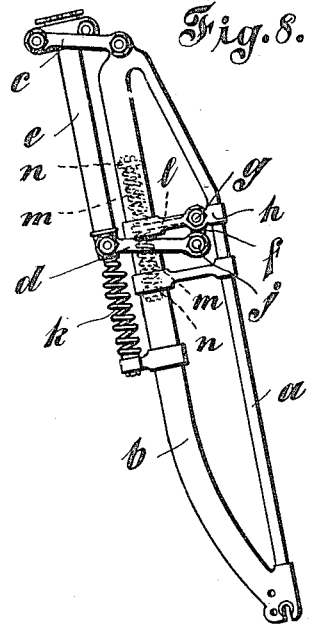
Figure 9:
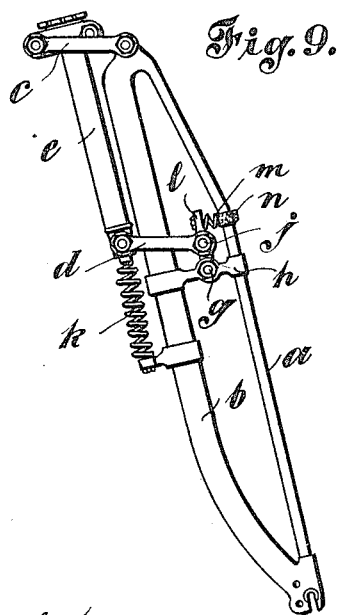
Figure 10:
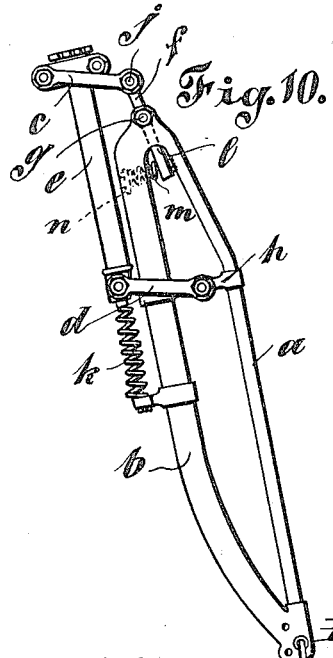

Fig. 4 illustrates an arrangement in which the oscillatory member has a forwardly extending arm or arms connected to springs disposed above said arm. Fig. 5 illustrates a modification in which a tension spring or springs is or are employed, said tension spring or springs being employed in connection with a rearwardly extending arm or arms of the oscillatory member. Fig. 6 illustrates the application of a tension spring or springs to the arrangement shown in Figs. 1 and 2. Fig. 7 illustrates a modification in which a leaf spring is used in lieu of the coiled spring shown in Fig. 3. Fig. 8 illustrates a modification in which both compression and tension springs are employed, the compression springs being used as shown in Figs. 1 and 2, and the tension springs being used as shown in Fig. 6. Fig. 9 illustrates the application of a tension spring or springs to the arrangement shown in Fig. 3. Fig. 10 illustrates an arrangement employed in connection with the upper links, and in which said links are connected to the oscillatory member, which latter has an arm or arms connected with a spring or springs adapted to act in compression. Any or all of the modifications may be employed in connection with the upper links of the fork. In Figs. 1, 2, 6, 8 and 11, the pivot of the oscillatory member is above the pivot of connection of such oscillatory member with the links, whereas in Figs. 3, 4, 5, 7, 9 and 10 the pivot of such oscillatory member is below such point of its pivotal connection with the links.

What we claim as the invention and desire to secure by Letters Patent is:—

1. A spring supporting device for the front wheels of cycles and the like comprising in combination a steering head, a fork, a link pivotally supported from the fork and connected to the lower extremity of the steering head, a second link pivotally connected to the fork and to the upper extremity of the steering head, said head, and fork links forming a parallelogrammic mechanism, a member having a pivotal connection with one of said links and which is itself pivotally movable about an axis which is near to the end of the parallelogrammic mechanism at which the connection of the link with the oscillatory member occurs, but which is not coincident with the axis of pivotal connection between the link and oscillatory member, and resilient means for resisting the upward movement of the fork.

2. A spring supporting device for the front wheel of cycles and the like comprising in combination a steering head, a fork, a link pivotally supported from the fork and connected to the lower extremity of the steering head, a second link pivotally connected to the fork and to the upper extremity of the steering head, said head, fork and links forming a parallelogrammic mechanism, a member having a pivotal connection with one of said links and which is itself pivotally movable about an axis which is near to the end of the parallelogrammic mechanism at which the connection of the link with the member occurs, but which is not coincident with the axis of pivotal connection between the link and oscillatory member, resilient means for resisting the upward movement of said fork, and resilient means for resisting the motion of said member which occurs at the time of the upward movement of said fork.

In witness whereof we have hereunto set our hands in the presence of two witnesses.

E. A. OSBORNE.
S. NIELD.

Witnesses:
ARTHUR H. BROWN,
HOLLIS F. BROWN.